United States Patent
Phan et al.

(10) Patent No.: US 7,737,573 B2
(45) Date of Patent: Jun. 15, 2010

(54) POWER OVER ETHERNET COMBINER

(75) Inventors: Julie Hanh Phan, San Jose, CA (US); Eric Tokubo, Newark, CA (US); Josh Rosenthal, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/138,890

(22) Filed: Jun. 13, 2008

(65) Prior Publication Data

US 2009/0309420 A1    Dec. 17, 2009

(51) Int. Cl.
*H04B 3/54* (2006.01)
(52) U.S. Cl. ............................................... 307/1; 307/3
(58) Field of Classification Search ................. 307/1–8, 307/71, 77, 52, 54; 340/310.11–310.18
See application file for complete search history.

(56) References Cited

U.S. PATENT DOCUMENTS 4,240,051 A    12/1980   Haugsjaa et al.
2005/0197094 A1   9/2005   Darshan et al.
2006/0112288 A1*   5/2006   Schindler .................... 713/300
2006/0171399 A1*   8/2006   Ferentz et al. ......... 370/395.53
2007/0253382 A1   11/2007   Ghassemzadeh et al.
2007/0284946 A1*   12/2007   Robbins ..................... 307/18

OTHER PUBLICATIONS

International Search Report and the Written Opinion of the International Searching Authority for International Application PCT/US09/45791 mailed Jul. 14, 2009.

* cited by examiner

*Primary Examiner*—Fritz M Fleming

(57) ABSTRACT

A system includes (a) an access point; (b) a switch providing power for use in the access point; and (c) a combiner disposed between the switch and the access point. The combiner receives at least two power supplies from the switch. The combiner is configured to combine the at least two power supplies to generate a third power supply. The third power supply is transferred to power the access point.

9 Claims, 5 Drawing Sheets

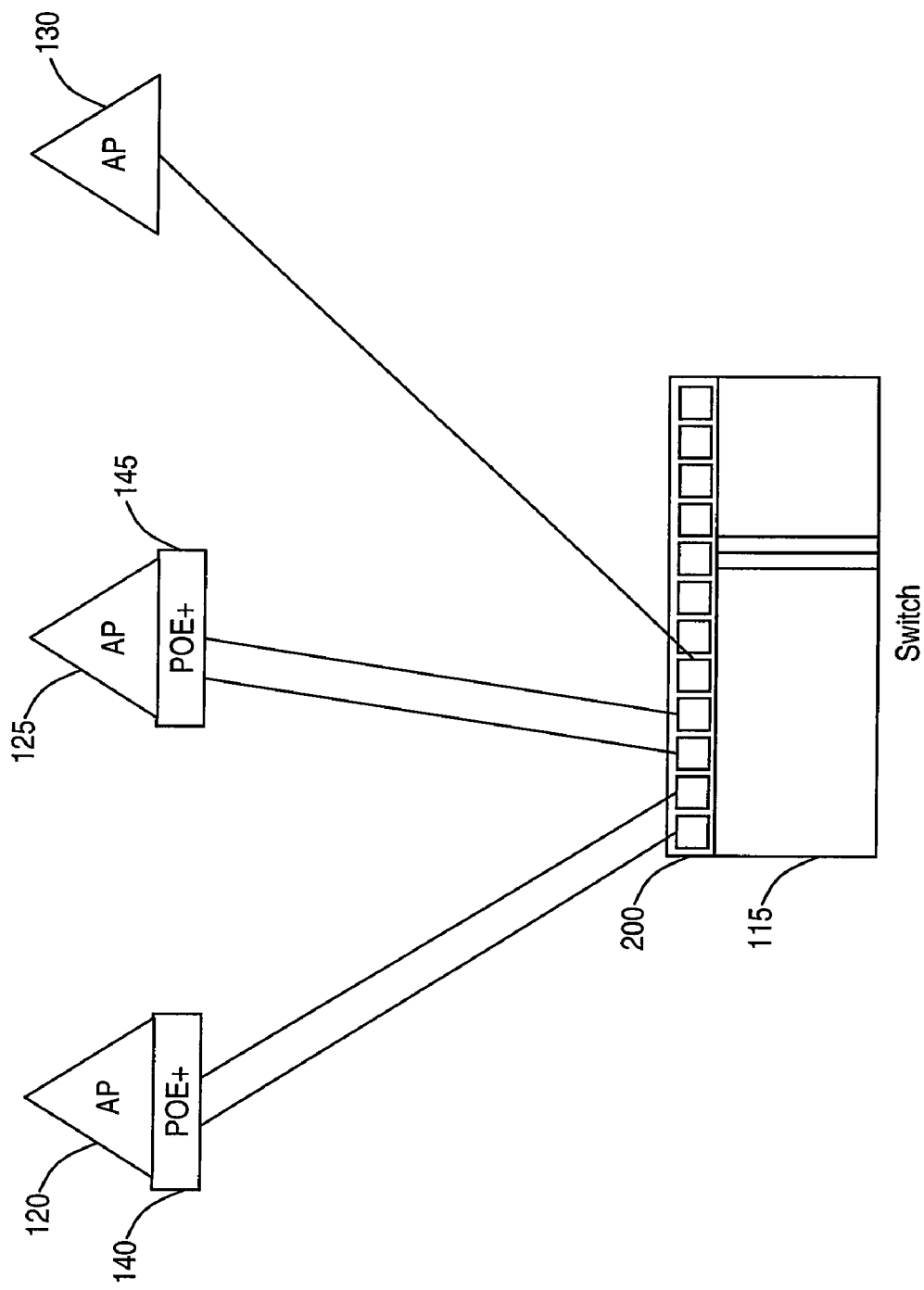

POWER OVER ETHERNET COMBINER

FIELD OF THE INVENTION

The present invention relates generally to a power over Ethernet combiner. Specifically, the combiner may provide a higher power when a network component requires additional power.

BACKGROUND

A network switch may provide a proper forwarding of signals to various network components. The network switch may also provide power to the various network components. Power over Ethernet (POE) is a system to transmit electrical power, along with data, to remote devices over a standard twisted-pair cable in an Ethernet network. For example, an access point (AP) may be powered using POE from the network switch.

Advances in AP technology have enabled more advanced APs that may, for example, provide further functionalities. However, these APs require more power than older models of APs. When network switches that only provide standard 802.3 af POE supplies are used, the APs are not provided with sufficient power. In particular, standard 802.3 af POE provides less than 15 watts of power. Continuous use of older models of APs limit the capabilities of the AP. Replacement of the network switches to models that are capable of providing the additional power to the advanced APs is costly.

SUMMARY OF THE INVENTION

The present invention relates to a system which includes (a) an access point; (b) a switch providing power for use in the access point; and (c) a combiner disposed between the switch and the access point. The combiner receives at least two power supplies from the switch. The combiner is configured to combine the at least two power supplies to generate a third power supply. The third power supply is transferred to power the access point.

DESCRIPTION OF THE DRAWINGS

FIGS. 2a-2c show the Power over Ethernet combiners of FIG. 1 according to exemplary embodiments of the present invention.

DETAILED DESCRIPTION

Figure 1:
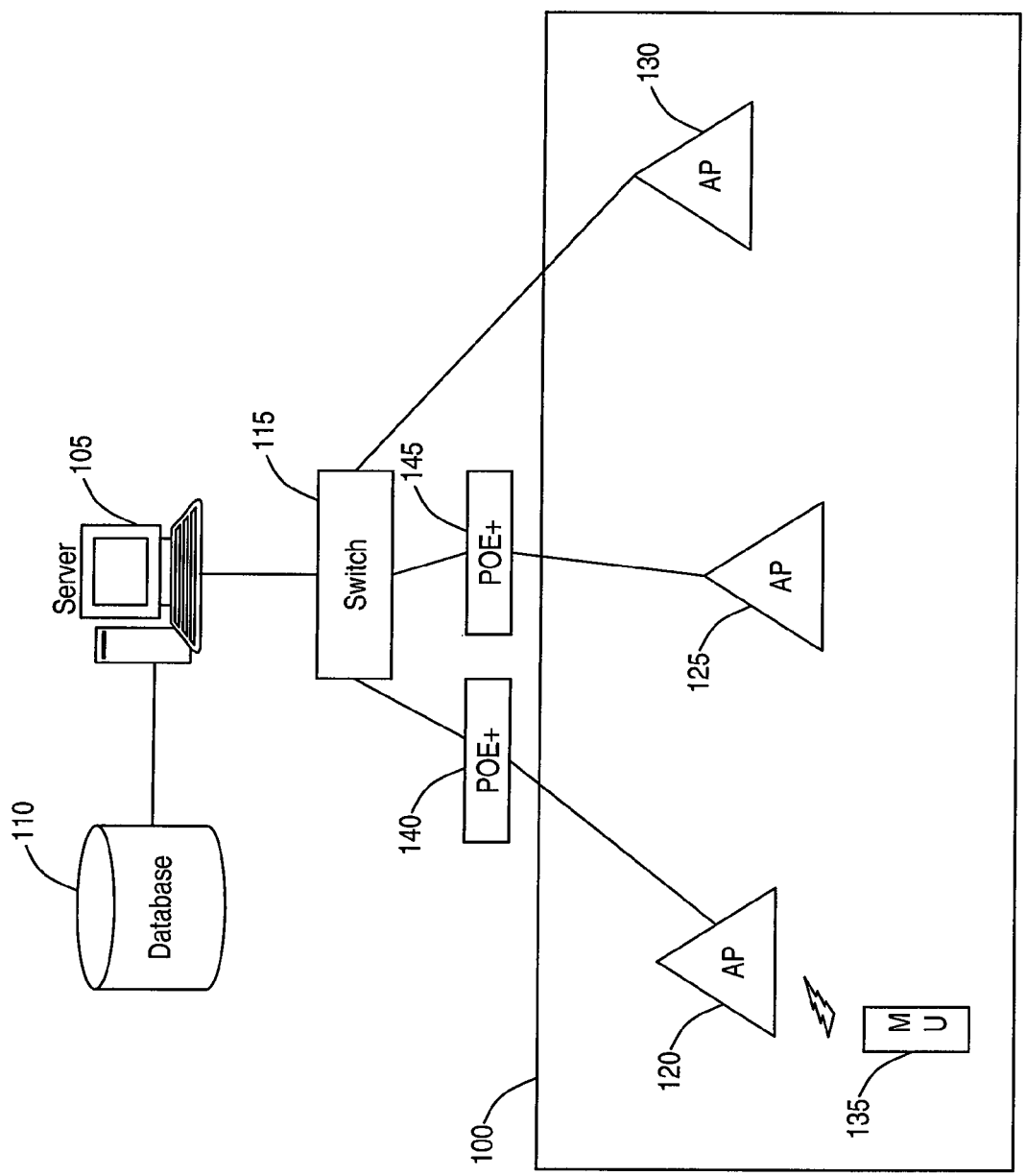
FIG. 1 shows a network with Power over Ethernet combiners according to an exemplary embodiment of the present invention.

The exemplary embodiments of the present invention may be further understood with reference to the following description and the appended drawings, wherein like elements are referred to with the same reference numerals. The exemplary embodiments of the present invention describe a Power over Ethernet (POE) combiner used to provide additional power to network components when a conventional network switch is provided for the network. According to the exemplary embodiments of the present invention, the POE combiner is disposed between the switch and an access point (AP) so that the AP is provided with the additional power. The POE combiner, the switch, the AP, and the additional power will be discussed in further detail below.

FIG. 1 shows a network 100 with POE combiners 140-145 according to an exemplary embodiment of the present invention. The network 100 may be any network such as a local area network (LAN), a wireless local area network (WLAN), a private area network (PAN), a virtual local area network (VLAN), a wide area network (WAN), etc. The network 100 may include a server 105, a database 110, a switch 115, APs 120-130, and the POE combiners 140-145.

The server 105 may be configured to be responsible for the operations occurring within the network 100. For example, the server 105 may associate authorized remote devices with the network 100. The database 110 may store data relating to the network 100 such as association lists. As will be discussed below, the database 110 may include data relating to an allocation of power to the APs 120-130.

The switch 115 directs data appropriately. For example, the signals transmitted from an associated remote device such as a mobile unit (MU) 135 may be determined by the switch 115 to be forwarded to the server 105. The switch 115 may only provide standard 802.3 af POE supplies (i.e., less than 15 watts). The switch 115 will be discussed in further detail below with reference to FIG. 2.

The network 100 may incorporate the APs 120-130 to extend a coverage area so that the MU 135 may connect to the network 100 in a greater number of locations. The APs 120-130 may contain an individual coverage area that is part of an overall coverage area of the network 100. That is, the APs 120-130 may serve as an intermediary for a transmission from the MU 135 to the switch 115. As illustrated, the MU 135 is wirelessly associated with the network 100 via the AP 120. However, if the MU 135 roams to another coverage area, the MU 135 may be associated with the network 100 via the other APs 125, 130. It should be noted that the network 100 may include further APs to further extend the coverage area of the network 100. The APs 120-125 may be advanced APs that require more power to execute additional functionalities. The AP 130 may be a conventional AP that does not require the additional power.

The POE combiners 140-145 may be disposed between the switch 115 and the APs 120-125, respectively. AS will be discussed in further detail below, the POE combiners 140-145 may provide additional power to the respective APs 120-125 using the switch 115 that provides standard 802.3 af POE supplies (i.e., less than 15 watts). Specifically, each of the POE combiners 140-145 receives power and data from a first port of the switch 115 and power from a second port of the switch 115. The POE combiners 140-145 may provide the data to the APs 120-125 in a conventional manner. The POE combiners 140-145 may combine the power inputs to provide the additional power to the APs 120-125 (e.g., 26 watts).

As illustrated, the AP 130 may not be provided data and power through an intermediary such as the POE combiner 140-145. That is, the AP 130 may be connected directly from the source which is the switch 115. As discussed above, the AP 130 may not require additional power to provide the functionalities capable therein. Thus, the standard 802.3 af POE supplies provided by the switch 115 may be sufficient.

Figure 2A:
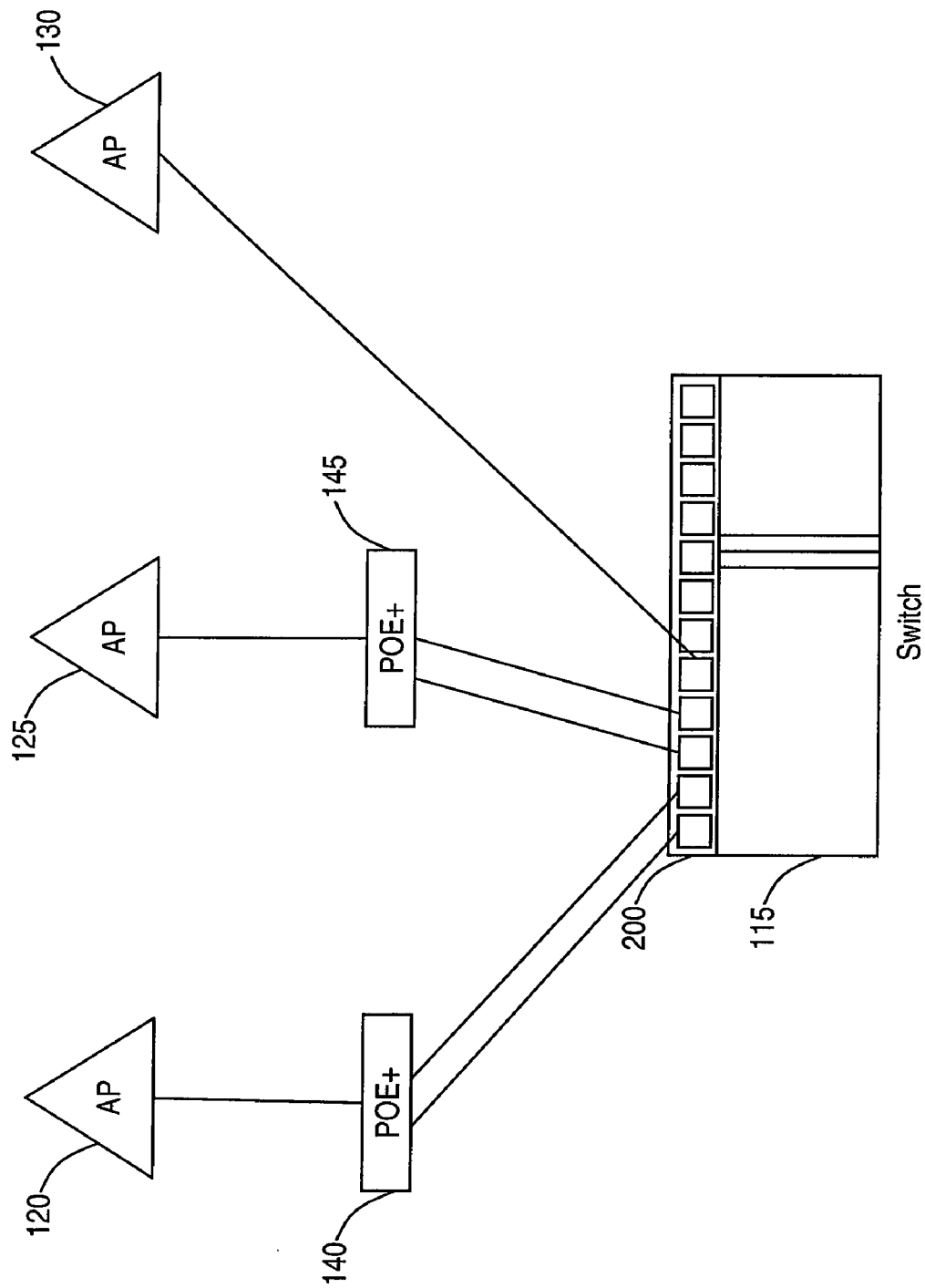

FIG. 2a shows the POE combiners 140-145 of FIG. 1 according to an exemplary embodiment of the present invention. Specifically, FIG. 2a illustrates connections between the switch 115, the POE combiners 140-145, and the APs 120-130. As illustrated, two Ethernet cables may be connected from the switch 115 to the POE combiner 140 and two Ethernet cables may be connected from the switch 115 to the POE combiner 145. One Ethernet cable may be connected from the POE combiner 140 to the AP 120; one Ethernet cable may be connected from the POE combiner 145 to the AP 125; and one Ethernet cable may be connected from the switch 115 to the AP 130.

The Ethernet cable may include four twisted pairs of wires that terminate in an 8 Position 8 Contact (8P8C) modular jack. Two of the four twisted pairs may be used to provide the power while one of the four twisted pairs may be used to provide data. As discussed above, two Ethernet cables are connected to each of the POE combiners 140, 145 from the switch 115. One of the Ethernet cables may use two twisted pairs for a first power to the POE combiners 140, 145 with one twisted pair for data while the other Ethernet cable may use two twisted pairs for a second power to the POE combiners 140, 145. The Ethernet cables may include a plurality of ports 200 (e.g., 8P8C port) in which the jack (e.g., 8P8C jack) of the Ethernet cables may be received. Accordingly, the POE combiners 140, 145 may include at least two ports in which the two Ethernet cables may be received. Because the APs 120-125 may be conventional advanced APs (e.g., includes additional functionalities) while the AP 130 may be a conventional standard AP (e.g., includes standard functionalities), the APs 120-130 may include a single port in which an Ethernet cable may be received.

As discussed above, the POE combiners 140-145 receive a first power and a second power (via the Ethernet cables) from the switch 115. Conventionally, about 15 watts of power are provided from a single Ethernet cable from the switch 115. The POE combiners 140-145 may receive the two separate sources of 15 watts of power via the two Ethernet cables. The POE combiners 140-145 may output about 26 watts of power. Thus, the APs 120-125 may be powered with the 26 watts of power. The AP 130 is powered directly from the switch 115. Thus, the single Ethernet cable provides the standard supply of about 15 watts.

Furthermore, data is provided to the APs 120-130. With respect to the APs 120-125, one of the Ethernet cables utilizes one of the twisted pairs to transmit data. The POE combiners 140-145 may receive the data and forward the data to the APs 120-125, respectively. With respect to the AP 130, the single Ethernet cable connected thereto may utilize one of the twisted pairs to transmit data from the switch 115 using a conventional method.

It should be noted that the use of Ethernet cables with 8P8C jacks is only exemplary. The exemplary embodiments of the present invention may utilize other forms of power transmittal. The exemplary embodiments of the POE combiners 140-145 may receive any two powers to be combined so that a higher power may be provided to the network component that receives the output of the POE combiner. For example, two cables each including a single twisted pair may be connected from the switch 115 to the POE combiner 140. The single twisted pair of each cable may provide a predetermined amount of power. The POE combiner 140 may combine the two powers to provide the higher power.

It should also be noted that the use of two Ethernet cables with 8P8C jacks is only exemplary. Because one of the Ethernet cables only provides power from the switch 115 to the POE combiners 140-145, this Ethernet cable may be a simplified cable. That is, the additional twisted pairs may be unnecessary so that a more cost effective cable (e.g., fewer twisted pairs) may replace the Ethernet cable only providing one of the powers to the POE combiners 140-145.

Figure 3:
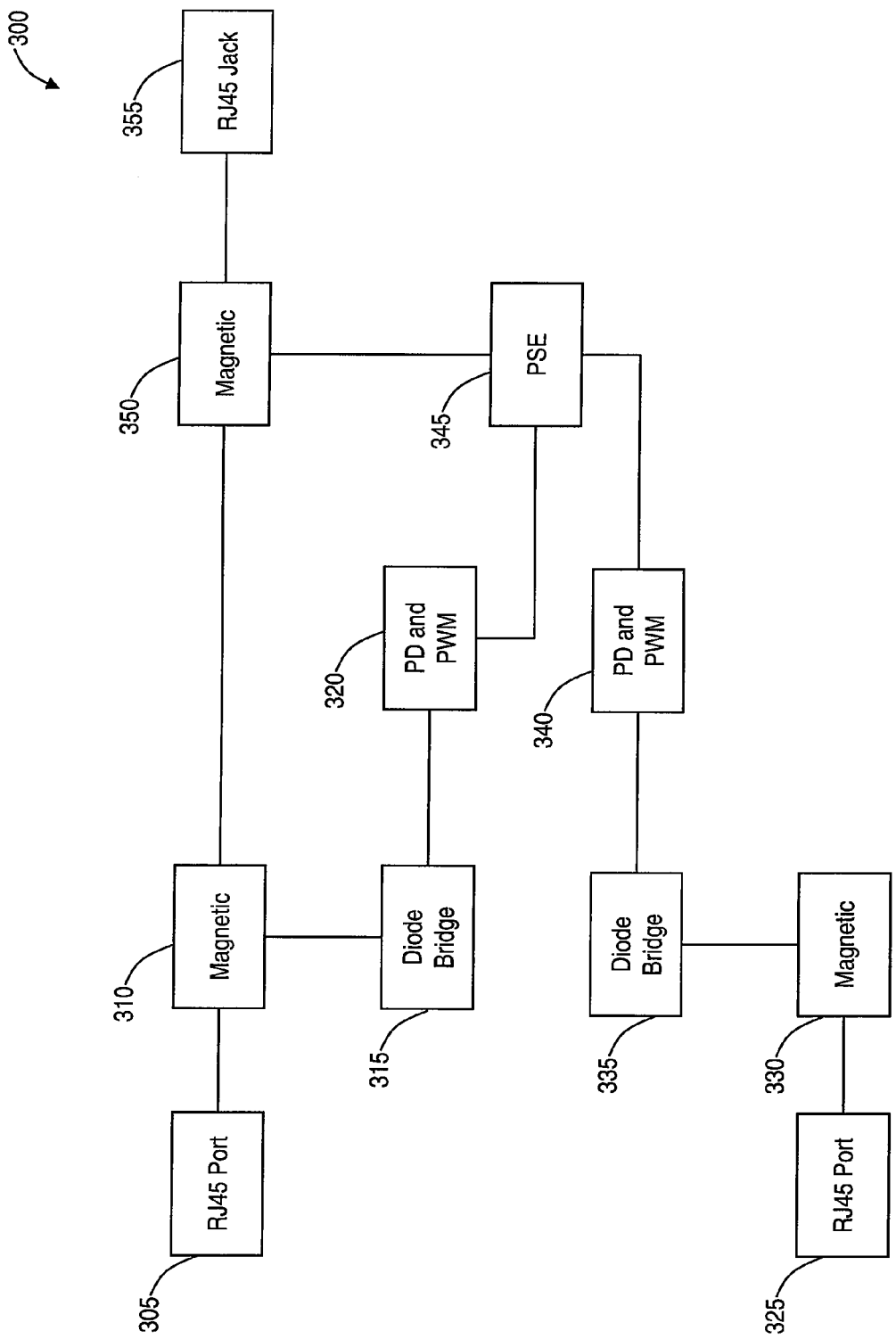
FIG. 3 shows a circuit diagram of the Power over Ethernet combiner of FIG. 1 according to an exemplary embodiment of the present invention.

FIG. 3 shows a circuit diagram 300 of the POE combiners 140-145 of FIG. 1 according to an exemplary embodiment of the present invention. The circuit diagram 300 illustrates components necessary to provide the additional power to the APs 120-125. It should be noted that the circuit diagram 300 assumes the use of Ethernet cables with 8P8C jacks and ports.

As discussed above, each of the POE combiners 140-145 receives two Ethernet cables from the switch 115. An RJ45 port 305 may receive a first 8P8C jack while an RJ45 port 325 may receive a second 8P8C jack from each of the two Ethernet cables. The port 305 may be connected to an Ethernet magnetic 310 while the port 325 may be connected to an Ethernet magnetic 330. Each of the magnetics 310, 330 may be a conventional Ethernet magnetic. That is, each of the magnetics 310, 330 may include an isolation transformer and a common-mode choke. The Ethernet magnetics 310, 330 may perform a filtering of the incoming power and/or data from the RJ45 ports 305, 325. Although the wires of the Ethernet cable are in twisted pairs to remove any magnetic interference created along the path of the wire, magnetic interference may still exist. The magnetics 310, 330 may further remove any magnetic interference. The magnetics 310, 330 may perform other filtering to provide improved (e.g., purer) signals for the POE combiners 140-145 to use.

The magnetic 310 may be connected to a diode bridge 315 while the magnetic 330 may be connected to a diode bridge 335. The diode bridge 315 may receive the first power from the RJ45 port 305 and the magnetic 310 while the diode bridge 330 may receive the second power from the RJ45 port 325 and the magnetic 330. The diode bridges 315, 335 may provide a constant output polarity from the polarities of the input. The constant output from the diode bridges 315, 335 may be provided to the power detects (PD) and pulse width modulators (PWM) 320, 340, respectively. The PD/PWMs 320, 340 may control an amount of power to be forwarded. For example, the PD/PWMs 320, 340 may be set for a predetermined amount of voltage and wattage to be forwarded. As discussed above, one of the ports 200 from the switch 115 may provide about 15 watts. Thus, 15 watts may be provided from the diode bridges 315, 335 to the PD/PWMs 320, 340, respectively. Furthermore, about 36 to 56 volts may be provided from the diode bridges 315, 335 to the PD/PWMs 320, 340. Therefore, inputs to the PD/PWMs 320, 340 may be about 15 watts and between 36 to 56 volts. According to the exemplary embodiments of the POE combiners 140-145, about 26 volts may be output from the PD/PWMs 320, 340.

The output from the PD/PWMs 320, 340 may be connected in series to a power sourcing equipment (PSE) control 345. With each of the PD/PWMs 320, 340 providing about 26 volts, the series connection to the PSE control 345 provides about 52 volts. The PSE control 345 may auto-negotiate for the power. In particular, the PSE control 345 may combine the two power outputs from the PD/PWMs 320, 340 to generate the higher power which may be predetermined. For example, if the higher power to be generated requires less than 52 volts, then the PSE control 345 may negotiate with the power received from the PD/PWMs 320, 340 to generate the desired output. That is, if the PD/PWMs 320, 340 are set to forward a predetermined voltage and wattage for a first power, the PSE control 345 may be set to generate a second (lower) power that is desired.

The higher power output generated by the PSE control 345 from combining the first power from the RJ45 port 305 and the second power from the RJ45 port 325 is received by a magnetic 350. The magnetic 350 may provide a further filtering of the power signals. That is, magnetic interference may have been generated between the magnetic 350 and the prior magnetics 310, 330.

The circuit diagram 300 further illustrates a connection between the magnetic 310 and the magnetic 350. This connection may illustrate the transmittal of data. That is, this connection may represent a pathway for the data signals from the one twisted pair from the RJ45 jack received in the RJ45 port 305. The data (from the connection between magnetic 310 and magnetic 350) and the power (from the PSE control 345) may be received by the RJ45 jack 355. When the RJ45 jack 355 is received by an AP, the data and the higher power may be provided thereto.

It should be noted that the transmittal of data may occur in an opposite direction (i.e., from the AP to the switch). The POE combiners 140-145 may also accommodate this transmittal direction as the data signals may go from the RJ45 jack 355 (that is received in an RJ45 port of the AP) to the magnetic 350 to the magnetic 310 to the RJ45 port 305 (that has received an RJ45 jack from the switch 115).

Figure 2B:
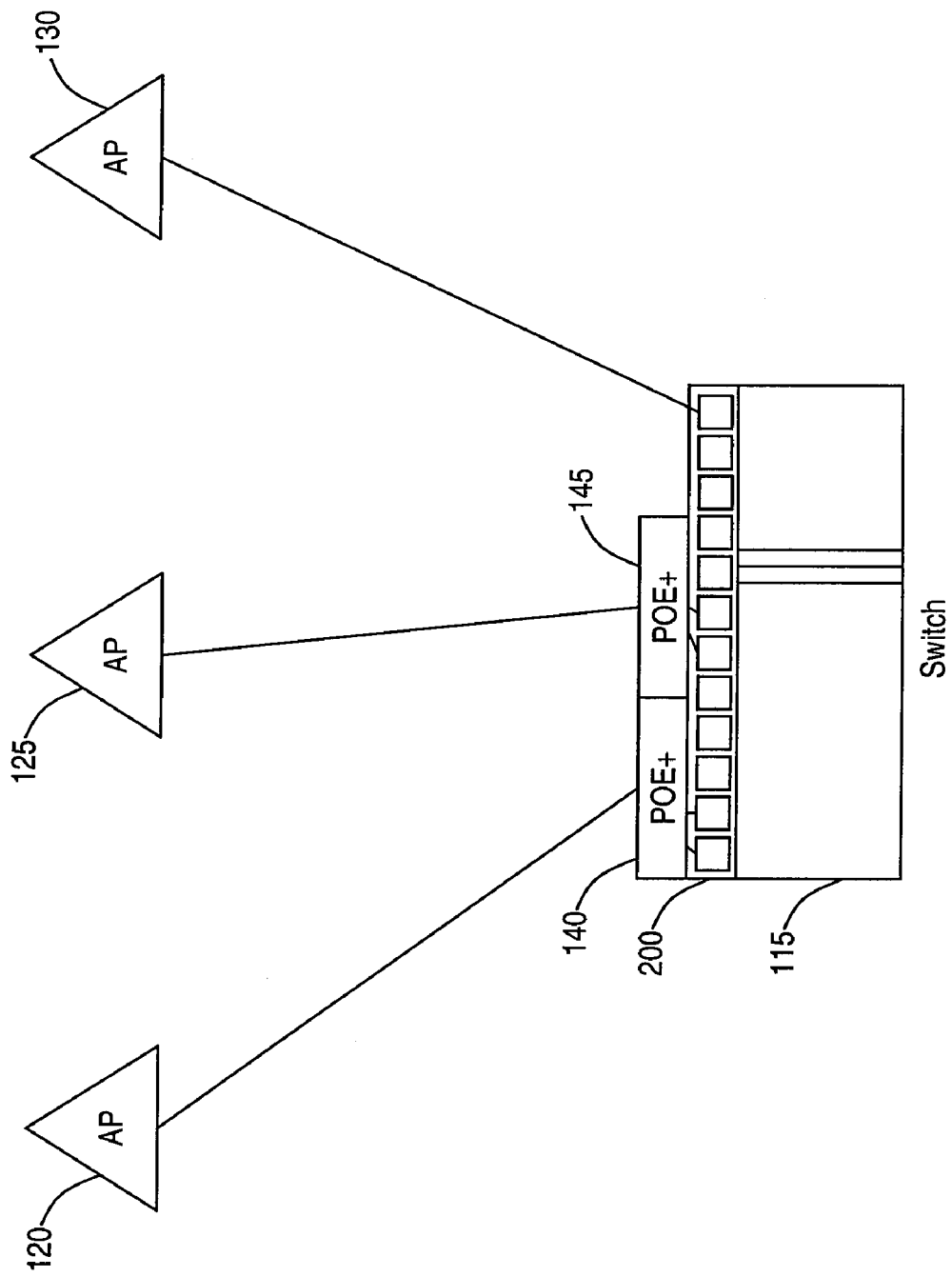

As discussed above, the POE combiners 140-145 may connect directly to the switch 115, as illustrated in FIG. 2b. In a first example of a direct connection, the POE combiners 140-145 may be a unit that includes two RJ45 ports that each receive an RJ45 jack from an Ethernet cable with an opposite end including an RJ45 jack received in a port of the switch 200. In a second example of a direct connection, the POE combiners 140-145 may be modules that include two RJ45 jacks that are received by two of the ports 200 of the switch 200. Accordingly, this exemplary embodiment does not require an additional set of Ethernet cables disposed between the switch 115 and the POE combiners 140-145.

It should be noted that the POE combiners 140-145 being disposed as a separate unit is only exemplary. In yet another exemplary embodiment, the POE combiners 140-145 may be incorporated into the APs 120-125, as illustrated in FIG. 2c. In such an exemplary embodiment, the RJ45 ports (e.g., 305, 325 of FIG. 3) may replace the single RJ45 port of the AP. Two Ethernet cables may run from the switch 115 to one of the POE combiners 140-145 that is part of the AP. For example, the POE combiners 140-145 may be a module for the APs 120-125.

It should also be noted that the use of two power supplies being combined to generate the higher power output is only exemplary. The POE combiners 140-145 may include further RJ45 ports to receive further power supplies. The POE combiners 140-145 may then combine the further power supplies to generate an even higher power output to power the AP.

The exemplary embodiments of the present invention enable using a conventional switch that provides a standard power supply (e.g., less than 15 watts) for a network that utilizes advanced APs that require more than the standard power supply. The POE combiner may receive at least two power supplies from the switch so that a higher power supply is provided to the AP so that the AP may execute any functionality that the AP is capable of performing. In particular, when the POE combiner is disposed as a separate unit or as a module to the switch, no alterations in configuration are required to the network components.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
    an access point comprising advanced functionality requiring a first amount of power in excess of IEEE 802.3 af power over Ethernet power supplies;
    a switch providing power for use in the access point, the switch comprising a plurality of power supplies each providing a second amount of power less than the first amount of power; and
    a combiner disposed between the switch and the access point, the combiner receiving at least two power supplies from the switch, the combiner being configured to combine the at least two power supplies to generate a third power supply comprising at least the first amount of power, the third power supply being transferred to power the access point, wherein the combiner comprises:
        a first magnetic and a second magnetic, wherein each of the magnetics receiving one of the at least two power supplies from the switch, and wherein each of the magnetic is configured to provide signal filtering;
        a first diode bridge connected to the first magnetic and a second diode bridge connected to the second magnetic, wherein each of the diode bridges is configured to provide a constant output polarity from input polarities;
        a first power detects and pulse width modulator connected to the first diode bridge and a second power detects and pulse width modulator connected to the second diode bridge, wherein each of the power detects and pulse width modulator is configured to forward a predetermined amount of voltage and wattage;
        power sourcing control connected to each of the power detects and pulse width modulator, wherein the power sourcing control is configured to negotiate and combine outputs of the each of the power detects and pulse width modulator to provide a desired output; and
        a third magnetic connected to the power sourcing control to provide filtering of the desired output.

2. The system of claim 1, wherein the combiner is further configured to exchange data between the switch and the access point.

3. The system of claim 1, wherein the combiner is a separate network component.

4. The system of claim 1, further comprising:
    a first cable with a first end received in a first output port of the switch and a second end received in a first input port of the combiner; and
    a second cable with a first end received in a second output port of the switch and a second end received in a second input port of the combiner.

5. The system of claim 4, further comprising:
    a third cable with a first end received in an output port of the combiner and a second end received in an input port of the access point.

6. The system of claim 1, further comprising: at least one further access point.

7. The system of claim 6, further comprising:
    a further combiner disposed between the switch and the at least one further access point.

8. The system of claim 1, wherein the combiner is a module of the switch.

9. The system of claim 1, wherein the combiner is incorporated in the access point, and wherein two separate cables connect the access point to the switch with each of the two separate cables carrying power and one of the two separate cables carrying data.

* * * * *